(12) United States Patent
Weedlun et al.

(10) Patent No.: US 8,883,293 B2
(45) Date of Patent: Nov. 11, 2014

(54) DIGITAL PRINTED APPLIQUE EMBLEM

(76) Inventors: Paul Weedlun, Ellicott City, MD (US); Susan Ganz, Owings Mills, MD (US)

( * ) Notice: Subject to any disclaimer, the term of this patent is extended or adjusted under 35 U.S.C. 154(b) by 1498 days.

(21) Appl. No.: 12/224,691

(22) PCT Filed: Mar. 1, 2007

(86) PCT No.: PCT/US2007/005335
§ 371 (c)(1),
(2), (4) Date: Sep. 2, 2008

(87) PCT Pub. No.: WO2007/103168
PCT Pub. Date: Sep. 13, 2007

(65) Prior Publication Data
US 2009/0025123 A1    Jan. 29, 2009

Related U.S. Application Data

(60) Provisional application No. 60/778,142, filed on Mar. 1, 2006.

(51) Int. Cl.
*B32B 3/00* (2006.01)
*B44F 11/00* (2006.01)
(Continued)

(52) U.S. Cl.
CPC ............. *A41D 27/08* (2013.01); *B44F 11/00* (2013.01); *D06Q 1/005* (2013.01); *B23K* (Continued)

(58) Field of Classification Search
CPC .......... D06Q 1/00; D06Q 1/005; D06Q 1/02; C06P 5/30; A41D 27/08; B23K 26/365; B23K 26/4055; B23K 26/4085; B41M 5/0041; B41M 7/00; B44F 11/00; D06M 10/005
USPC ................. 428/196; 101/483; 2/244
See application file for complete search history.

(56) References Cited

U.S. PATENT DOCUMENTS

| | | | |
|---|---|---|---|
| 4,181,423 A | 1/1980 | Pressman et al. | |
| 5,009,943 A | 4/1991 | Stahl | |

(Continued)

OTHER PUBLICATIONS

Manufacturers of electrostatic printers include RasterGraphics (Orchard Parkway, San Jose, Calif.) and 3M (St. Paul, Minn.) (Flaar Reports—website).

(Continued)

*Primary Examiner* — Elizabeth Cole
(74) *Attorney, Agent, or Firm* — Ober, Kaler, Grimes & Shriver; Royal W. Craig

(57) ABSTRACT

A process for applying digitally printed applique" indicia which results in decorative and identification elements for decoration and identification when applied to uniforms, fashion, "basic" and performance apparel, swimwear and intimate apparel as well as other textile products, the elements being an alternative to direct embroidery, embroidered emblems, thermo-transfer films, silk screen or sublimated printing. The production process includes the following phases (FIGS. 3A-C): a design phase (1); a separation phase (2); a printing phase (3); an optional traditional embroidery phase (4); and an etching/cutting phase (5). The process can incorporate embroidered elements but has the benefit of reducing or eliminating portions of stitching and or extra applique layers in the emblem. The resulting product has superior care and durability characteristics to screen printing and heat transfers as the image is more wash fast and can be ironed. The heat or pressure transfer capability can allow much faster customization of finished garments.

10 Claims, 4 Drawing Sheets

(51) Int. Cl.

| | | |
|---|---|---|
| *A41D 27/08* | (2006.01) | |
| *D06Q 1/00* | (2006.01) | |
| *B23K 26/08* | (2014.01) | |
| *B23K 26/40* | (2014.01) | |
| *D06P 5/30* | (2006.01) | |
| *B44C 1/17* | (2006.01) | |
| *B23K 26/38* | (2014.01) | |
| *D06M 10/00* | (2006.01) | |
| *D06Q 1/02* | (2006.01) | |
| *B23K 26/36* | (2014.01) | |
| *B41M 7/00* | (2006.01) | |
| *B41M 5/00* | (2006.01) | |

(52) U.S. Cl.
CPC . 26/0876 (2013.01); *B23K 26/4055* (2013.01); *B41M 7/0081* (2013.01); *D06P 5/30* (2013.01); *B41M 7/00* (2013.01); *B44C 1/1712* (2013.01); *B23K 26/385* (2013.01); *B23K 26/4085* (2013.01); *D06M 10/005* (2013.01); *B23K 26/0807* (2013.01); *B23K 26/38* (2013.01); *D06Q 1/00* (2013.01); *D06Q 1/02* (2013.01); *B41M 7/009* (2013.01); *B23K 2201/18* (2013.01); *B41M 5/0041* (2013.01); *B23K 26/365* (2013.01)
USPC .............................. 428/196; 101/483; 2/244

(56) References Cited

U.S. PATENT DOCUMENTS

| | | | |
|---|---|---|---|
| 5,635,001 | A | 6/1997 | Mahn, Jr. |
| 5,749,032 | A | 5/1998 | Landa et al. |
| 5,899,604 | A | 5/1999 | Clark |
| 5,914,176 | A | 6/1999 | Myers |
| 6,192,292 | B1 * | 2/2001 | Taguchi ........................ 700/138 |
| 6,752,075 | B2 | 6/2004 | Ciaramitaro et al. |
| 6,875,395 | B2 * | 4/2005 | Kisha et al. .................... 264/482 |
| 2005/0090928 | A1 * | 4/2005 | Gibson ......................... 700/133 |

OTHER PUBLICATIONS

Thermal Inkjets for example, the Colorfast™ Fabrijet™ Thermal InkJet (Flaar Reports—website).
Stork Digital Imaging has introduced its Sapphire II™ digital printer (website).
The DuPont™ Artistri™ website—.

* cited by examiner

DIGITAL PRINTED APPLIQUE EMBLEM

This application is a 371 of PCT/US07/05335 filed Mar. 1, 2007.

BACKGROUND OF THE INVENTION

1. Field of the Invention

The present invention relates to transfer emblems containing fine-cut and digitally-printed detailing such as appliqué text, logo graphics, numbers or other indicia and which may simulate a finely-embroidered appearance, for adhesive application, such as thermal activated or pressure sensitive adhesives, directly onto garments, apparel, and accessories, for identification, decoration, trademarking or otherwise embellishing the final product, thereby eliminating the need for sewn embroidery, thermo-transfer films, silk screen or sublimated printing.

2. Description of the Background

Fashion, "basic" and performance apparel, uniform, swimwear, intimate apparel, outerwear and accessory manufacturers use various methods to apply decoration and identification to garments and textiles. They tend to use silk-screening, screen-printing, thermo-transfer films, sonic welding and direct embroidery as their primary methods for decorating and identification.

Silk-screening of logos or emblems is commonly used, but this process is complex and time-consuming. In addition, the designs created by silk-screening are flat, lack texture, and do not withstand repeated industrial or home washings. Consequently, many companies prefer embroidery as their primary method for applying decoration and identification.

Sonic welding is another method used to apply decoration and identification to garments and textiles. This process requires the creation of unique, expensive special dies for any design to be applied. The quick-change requirements associated with the fashion industry make this process slow and relatively expensive. Sonic welding allows texturing, but also requires chemical compounds that some companies find unacceptable, and that can result in a product that does not withstand repeated home and industrial laundering. Indeed, this process typically is not used by the uniform industry for these reasons. Embroidery has instead become the primary method for applying decoration and identification.

Embroidery is typically performed by a machine that applies stitching of various colors and styles to fabric to create a design. Embroidered designs have a much greater aesthetic value, and yet this too is a complex, time-consuming process. A separate stitching step is required for each color in the design and for each design element.

U.S. Pat. No. 5,009,943 to Stahl discloses a method for producing a multi-colored emblem that may be ironed-on to garments to provide an embroidered appearance. This method entails laminating a material blank, cutting the laminated material to a specific design, embroidering about the periphery of the cut design, laminating the assembly onto a second material blank, and coating the underside with a thermal adhesive layer. The emblem can then be heat-sealed to a garment. Despite the ability to give a realistic embroidered look, emblems produced using Stahls' method are relatively large, bulky and inflexible. Moreover, the design elements are solid colored dyed material, limiting design detail, and still require sewn-embroidery, and are die-cut, thereby requiring these three separate and inefficient processing steps. The uniform and apparel industries are tending to move toward less expensive emblems that nevertheless convey an authentic embroidered look.

There are other transfer emblems that may be applied to various cloth surfaces without embroidery. For example, U.S. Pat. No. 5,635,001 to Mahn, Jr. issued Jun. 3, 1997 shows cloth transfers that include a cloth layer coated with a plastic layer which is, in turn, coated with a pressure sensitive adhesive layer.

U.S. Pat. No. 5,914,176 to Myers issued Jun. 22, 1999 shows a composite design for attachment to another fabric article, comprising an underlying layer of twill fabric on one side of which a design is screen printed with plastisol based inks and heat cured. The twill is cut into a desired shape so that the twill and the ink portion form the composite design. Methods of making and attaching the composite design are disclosed.

Though stitched embroidery is avoided, in both of the foregoing cases the ink designs are screen printed and cutting is die-cutting. These are independent steps creating a cumbersome process. The resulting product is inferior in durability to washing and cannot be ironed. Further the preferred embodiment uses plastisols in the inks which are objectionable to many apparel manufacturers. More recent technological advances have been made in the field of digital printing and advanced cutting to reduce the cost, development cycle time, product cycle time and required inventories.

For example, laser etching allows art or lettering to be cut into a material by a laser beam that vaporizes the portion exposed through openings in a template. This can add fine etched details, but not print designs since no ink is deposited.

There are other digital printing methods that can potentially accomplish the latter. For example, four-color electrostatic printing is described in U.S. Pat. No. 5,899,604 to Clark.

U.S. Pat. No. 4,181,423 to Pressman et al. discloses a method and an apparatus for modulated aperture electrostatic half tone printing using modulated ion streams and transparent toners. Color images are formed by overlaying black, magenta, cyan, and yellow images to form a full color image, where additional colors, such as metallics, may be added for special effects.

U.S. Pat. No. 5,749,032 to Landa et al. discloses a color imaging system in which separate yellow, magenta, cyan, and black liquid toners are supplied from four different reservoirs.

Manufacturers of electrostatic printers include Raster-Graphics (Orchard Parkway, San Jose, Calif.) and 3M (St. Paul, Minn.), all of whom have introduced 54 inch wide printers with multiple inking fountains for displays, signs and banners, trade show graphics, outdoor billboards, fleet graphics, bus shelters, wall paper, vinyl flooring, and backlit displays, etc. Dye sublimation has dramatically increased the applications for electrostatic printing. By imaging first on electrostatic paper and then applying heat, pressure and time, color images can be transferred onto a wide variety of other substrates, including, but not limited to a wide variety of polyester fabrics. While the dye sublimation process has allowed a greater range of applications, it remains relatively expensive and not well-suited for apparel and fabric trim printing and requires additional process steps, time and set-up for putting an image onto fabric.

Thermal Inkjets are a new print format that are capable of economical high-quality production-speed fabric printing. For example, the Colorfast™ Fabrijet™ Thermal Inkjet is capable of 600 dpi or 1200 dpi using 12 printing heads that deposit a reactive, acid CMYK ink.

Similarly, Stork Digital Imaging has introduced its Sapphire II™ digital printer for high-quality sampling and production runs on textile and apparel. This system is capable of printing on a wide variety of natural and synthetic textiles including silk and polyamide, as well as stretch fabrics.

The DuPont™ Artistri™ is a fully integrated, production capable digital printing system developed for printing on all type of fabrics including cellulosic, polyamides and polyesters. The system was designed for a variety of applications, including printed textiles, accessories, apparel, home furnishings, gaming table covers, flags and banners, soft signage, and trade show displays. This thermal inkjet printer is also equipped with an on-board heating unit that is designed to cure the inks onto the fabrics before they exit the roll-to-roll printer. The final setting of the inks on polyesters can occur on a heated calendar.

Despite these print hardware advances, these thermal inkjet digital printers have only been used for direct textile printing. They have not heretofore been used for intermediate printing onto a substrate that can be coated with adhesive backings, such as thermal activated or pressure sensitive adhesives for later application to a fabric substrate. Thus, there is no current production method for producing multi-colored emblems that may be quickly and efficiently sealed on to garments to provide an embroidered and or appliquéd appearance.

It would be greatly advantageous to provide process for producing a transfer applique bearing various combinations of digitally-printed elements such as letters, logo graphics and numbers or other indicia, that could include laser-etching to accentuate the foregoing and potentially some stitch elements, then laser or die-cutting of the elements all in a format that is easily applied to a garment or other textile so that all of the elements are precisely registered without using direct embroidery to apply the appliqué to the garment.

SUMMARY OF THE INVENTION

It is, therefore, the primary object of the present invention to provide a novel adhesive appliqué bearing text, numbers, logos and other indicia for the uniform and other industries that serves as a replacement for embroidery, thermo-transfer films, silk screen or sublimated printing. The appliqué gives a monogrammed appearance from combinations of discrete precisely cut, printed and etched text, numbers or graphics.

It is another object to provide digitally printed appliqué text, numbers, logos and other indicia capable of being heat sealed to a garment or other article that, when so secured, creates a new form of decoration that appears to be an embroidered part of the garment.

According to the present invention, the above-described and other objects are accomplished by a product and process for applying digitally printed appliqué indicia which is capable of being adhered to a garment or other article by a pressure sensitive or thermal activated adhesive and, when so secured, gives the appearance of a multicolored graphical design that can simulate stitched designs or layered textile embellishment. The production process for digitally printed appliqué emblems as described above begins with (1) a design phase by which a distinct image file is digitally created using raster imaging software (for newly generated artwork) or is derived from a pre-established design by scanning or the like. In either case the image file preferably incorporates both printed image elements (text, numbers and/or logo) as well as engraving elements and/or cutting elements (one skilled in the art should understand that separate files may be created for these separate elements. Design phase (1) is followed by (2) a separation phase in which (according to the preferred method) the cutting elements from the raster file are isolated and converted into a vector cut file(s) to optimize cutting speed; and (3) a printing phase by which the raster image file is input into a digital printer which translates the pixel color values of the raster image file to obtain the optimal color match for driving a digital printer based on the ink dye set used by that particular printer. The digital printer then precisely applies the ink droplets to a fabric substrate and thermally sets the ink (and optionally post treats to improve fastness properties).

At this point it is possible to include traditional stitching elements as part of a traditional appliqué embroidery process.

Design phase (1), separation phase (2) and printing phase (3) are followed by (4) a coating/laminating phase by which the printed fabric substrate is coated with a thermoplastic or pressure sensitive adhesive on its backside for later heat-sealing or pressure sealing to a garment. This fourth step can be done prior to digital printing but with present printing technology it would compromise image quality and color fastness. Next, an etching/cutting phase (5) occurs including optional laser-etching of the front-side of the emblem to texturize and accentuate a textured appearance of embroidery stitching, followed by die-cutting or laser-cutting of the emblem from the substrate. The foregoing process results in an emblem bearing a combination of digitally-printed elements such as letters, logo graphics and numbers or other indicia, which may include a simulated embroidery-stitched appearance from either said printing or laser-etching or some combination of both, and all in a form that is easily heat-sealed or pressure-sealed to a garment or other textile. All excess materials from the cutting and etching steps are removed, and the digitally printed appliqué is packaged for heat-transfer or pressure sensitive application to a garment. The thermal bonding or pressure sensitive adhesive process eliminates the need for sewing or other bonding processes.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention is an adhesive appliqué transfer emblem bearing text, numbers, logos and other indicia for the uniform and other industries, as well as the novel process for efficiently producing it in mass production using digital printing, etching and/or cutting techniques. The emblem includes a multi-color printed design appearance with or without simulated and/or textured embroidery stitching, and may be heat sealed to an article of clothing or clothing accessory. In each case the emblem is well-suited for application to any fabric or leather substrate, including coarser non-woven fabrics such as felt and fleece ("non-woven being herein defined as any fabric substrate produced by processes other than weaving. The suitability for a particular fabric depends on the particular heat-seal thermoplastic film used, and as described below various films are available for various fabrics.

Figure 1:
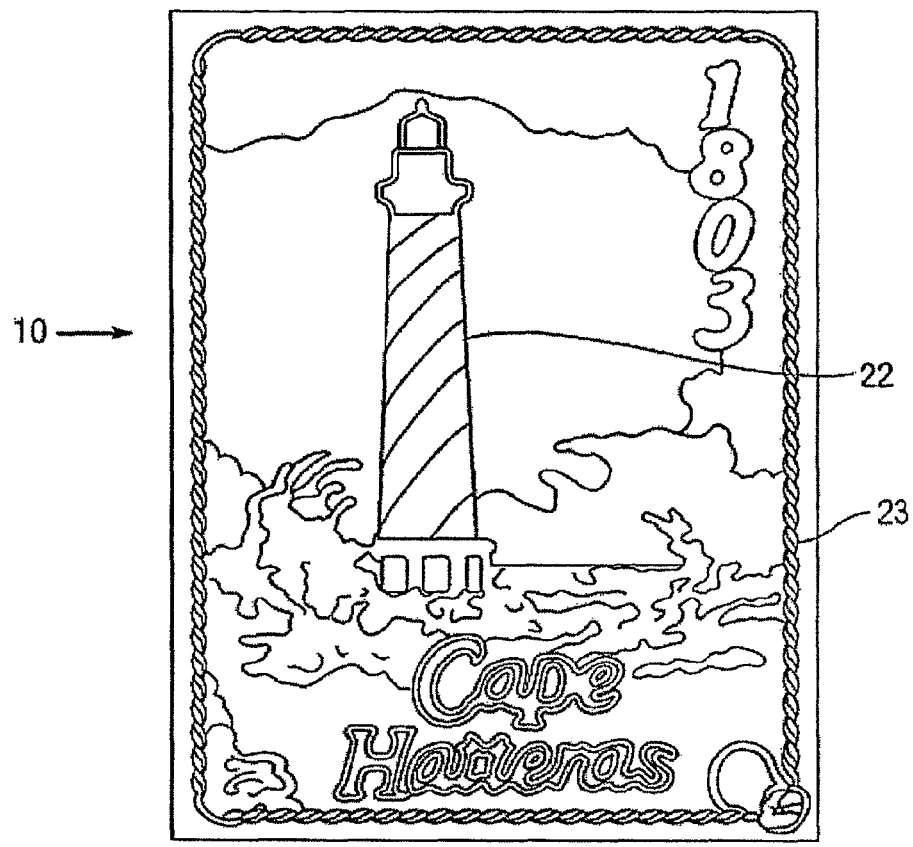
FIG. 1 is a perspective view of an exemplary emblem 10 according to the present invention as applied to a shirt.

FIG. 1 is a perspective view of an exemplary emblem 10 according to the present invention as would appear when applied to a shirt, jacket, etc. The emblem 10 may include text and/or a design logo, and when heat sealed to the shirt it gives an aesthetically-pleasing embroidered appearance.

Figure 2:
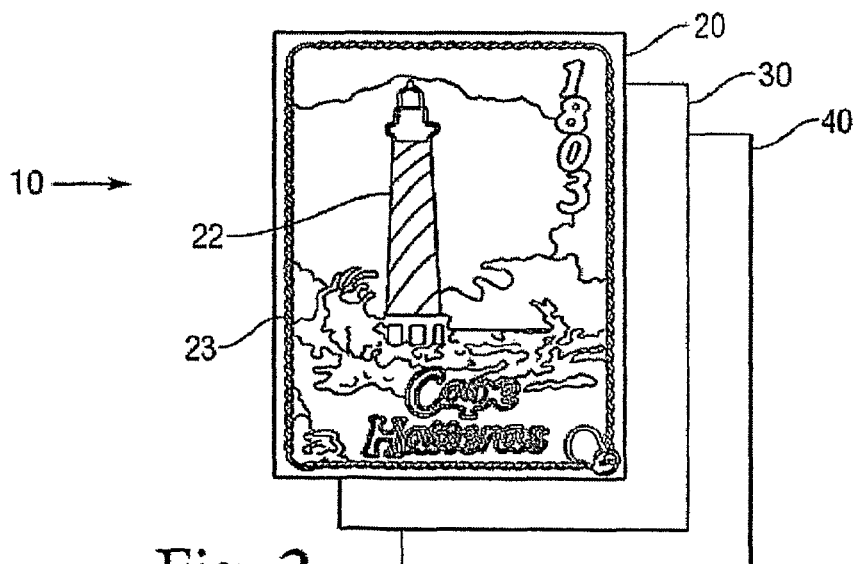
FIG. 2 is an exploded perspective view of the component layers of the emblem 10 as in FIG. 1.

FIG. 2 is an exploded perspective view of the component layers of the emblem 10 as in FIG. 1. The emblem 10 generally comprises a printed and (optionally) etched fabric substrate 20 and underlying thermoplastic laminate 30 that are preformed, adhered together (as will be described) and thereby adapted to be heat/pressure laminated to an article of clothing or clothing accessory. Prior to lamination the fabric substrate 20 and underlying thermoplastic laminate 30 may be carried on a release layer 40 which may be cellophane or any other suitable translucent or transparent carrier layer that remains stable at elevated heat-seal temperatures.

The fabric substrate 20 comprises a layer of twill fabric on which ink portions 22, 23 have been printed. The ink portion 22 represents a multi-color graphic design and the ink portion 23 represents printed/etched simulated embroidery stitching. While the illustrated fabric substrate 20 is polyester twill, other fabrics are suitable. Twill fabric incorporates a twill pattern identified by characteristic diagonal lines. For example, 2/2 twill has two warp threads up for every two down, made by passing the weft threads over one warp thread and then under two or more warp threads. However, fabric substrate 20 may be any non-woven or other fabric (produced by processes other than weaving) as a matter of design choice, provided that the qualities of fabric substrate are suitable for printing and achieve the consistent or contrasting appearance with the clothing article so as not to detract there from.

The thermoplastic laminate 30 is preferably a thermoplastic film laminate (polyurethane, polyolefin, or polyester), but could be powder, liquid or foam applied versions of thermoplastics that will create a laminate having a nominal thickness within a range of approximately 2-7 thousandths of an inch, a unit weight of approximately 31 gm/m2 and within a range of from 20-35 gm/m2, a glue line (melt) temperature of approximately 307 degrees fahrenheit within a range of from 225-350 degrees Fahrenheit, and a softening point temperature below that of the glue line (melt) temperature and approximately 257 degrees Fahrenheit within a range of from 190-260 degrees Fahrenheit. One exemplary laminate 30 is available as Polyurethane film no. 3205 from Bemis Associates Inc., One Bemis Way, Shirley, Mass. 01464. Other Beamis polyurethane films such as nos. 3209, 3218, 3220, 3248, 3410 are suitable. Alternatively, Nylon (polyamide) and Polyester films such as the Bemis 4000-series and 5000-series films are acceptable. In all such cases these are environmentally friendly laminates are made without volatile organic compounds (VOC's) such as PVC. Alternative adhesives such as pressure sensitive adhesives can be used depending on the garment type and the wash characteristics required.

Figure 3A:
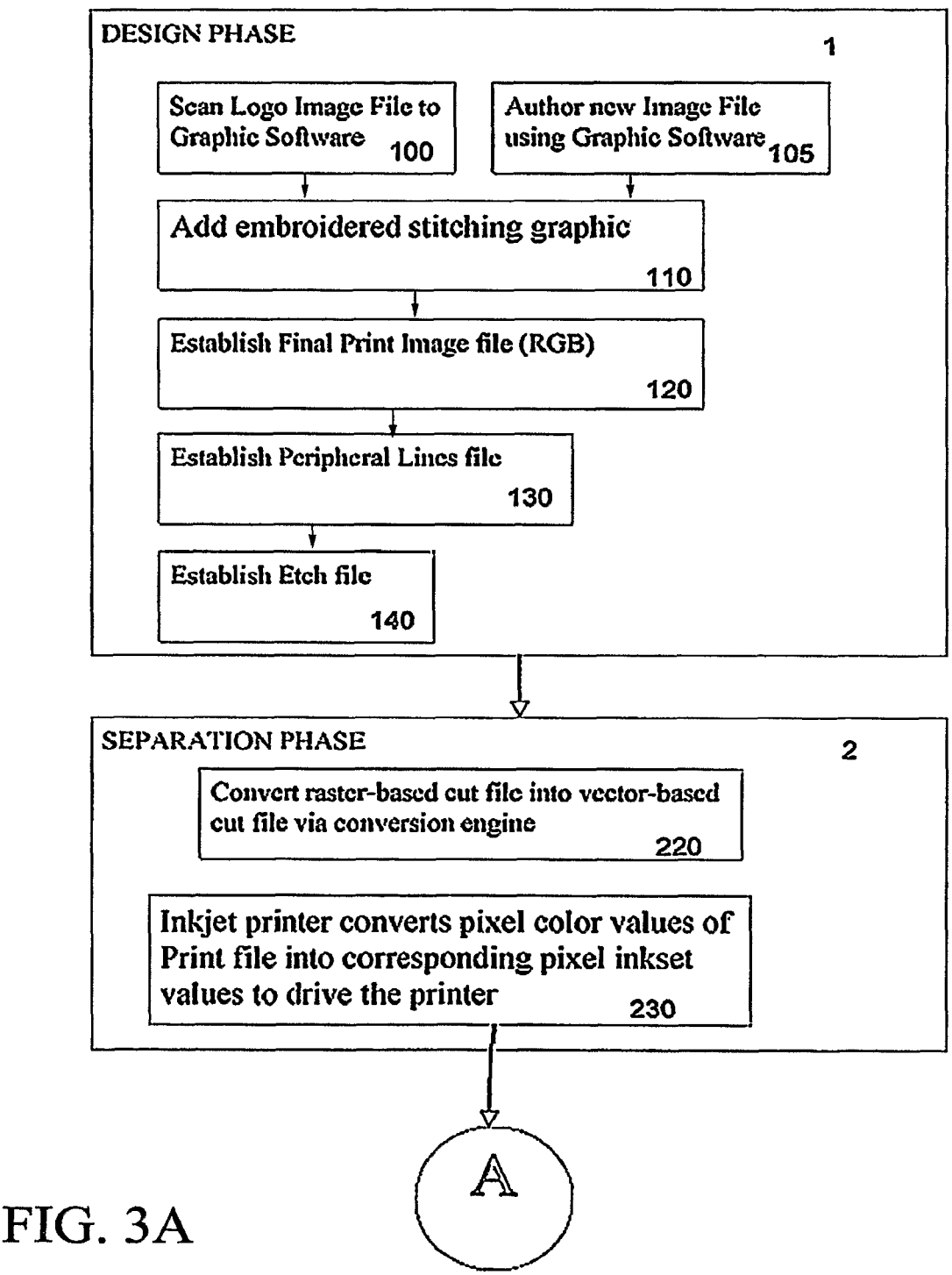
FIGS. 3(A-C) collectively comprises a block diagram of the method steps involved in producing and applying the performance embroidered emblem 10 as in FIGS. 1 & 2.
Figure 3B:
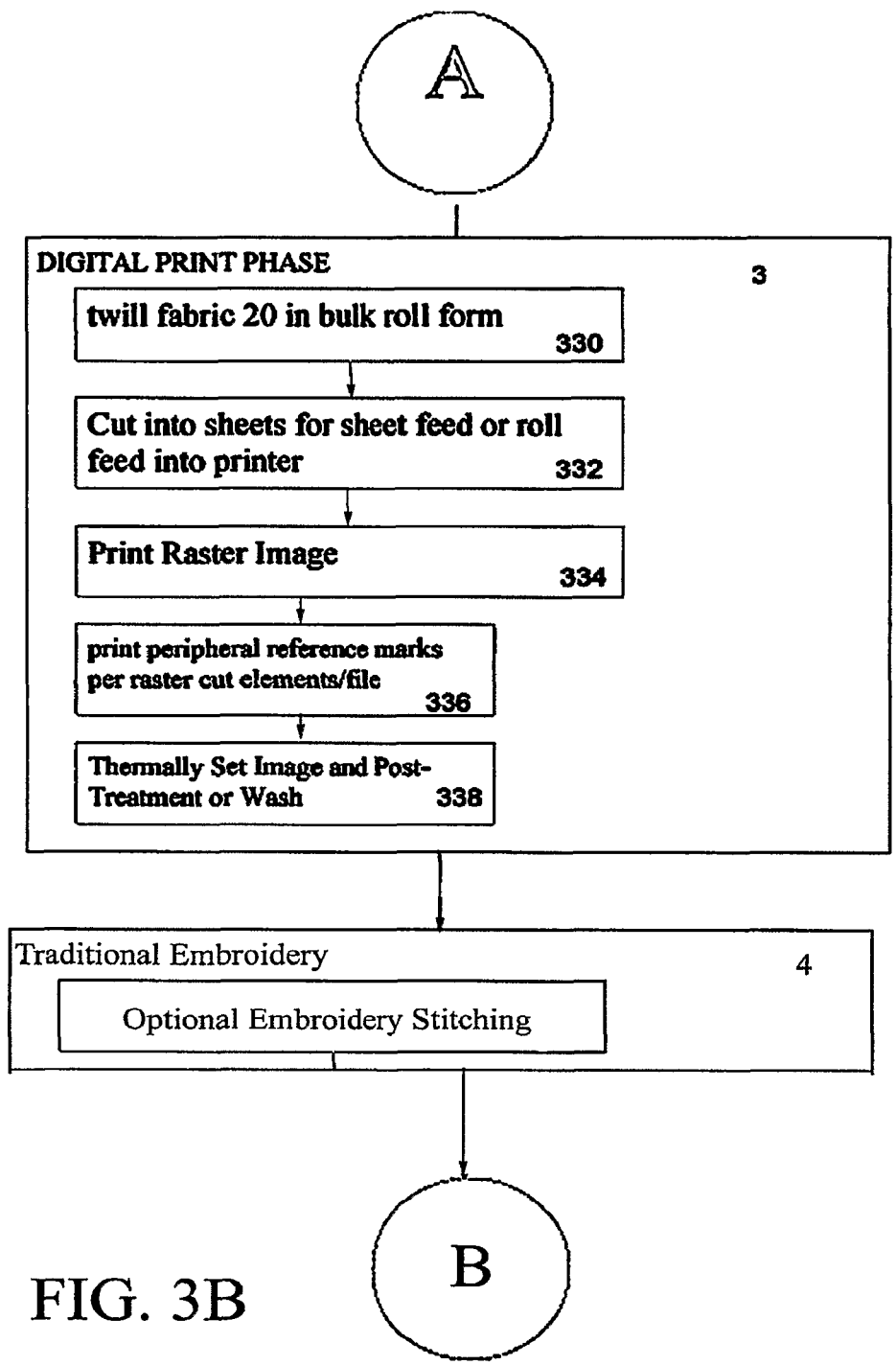
Figure 3C:
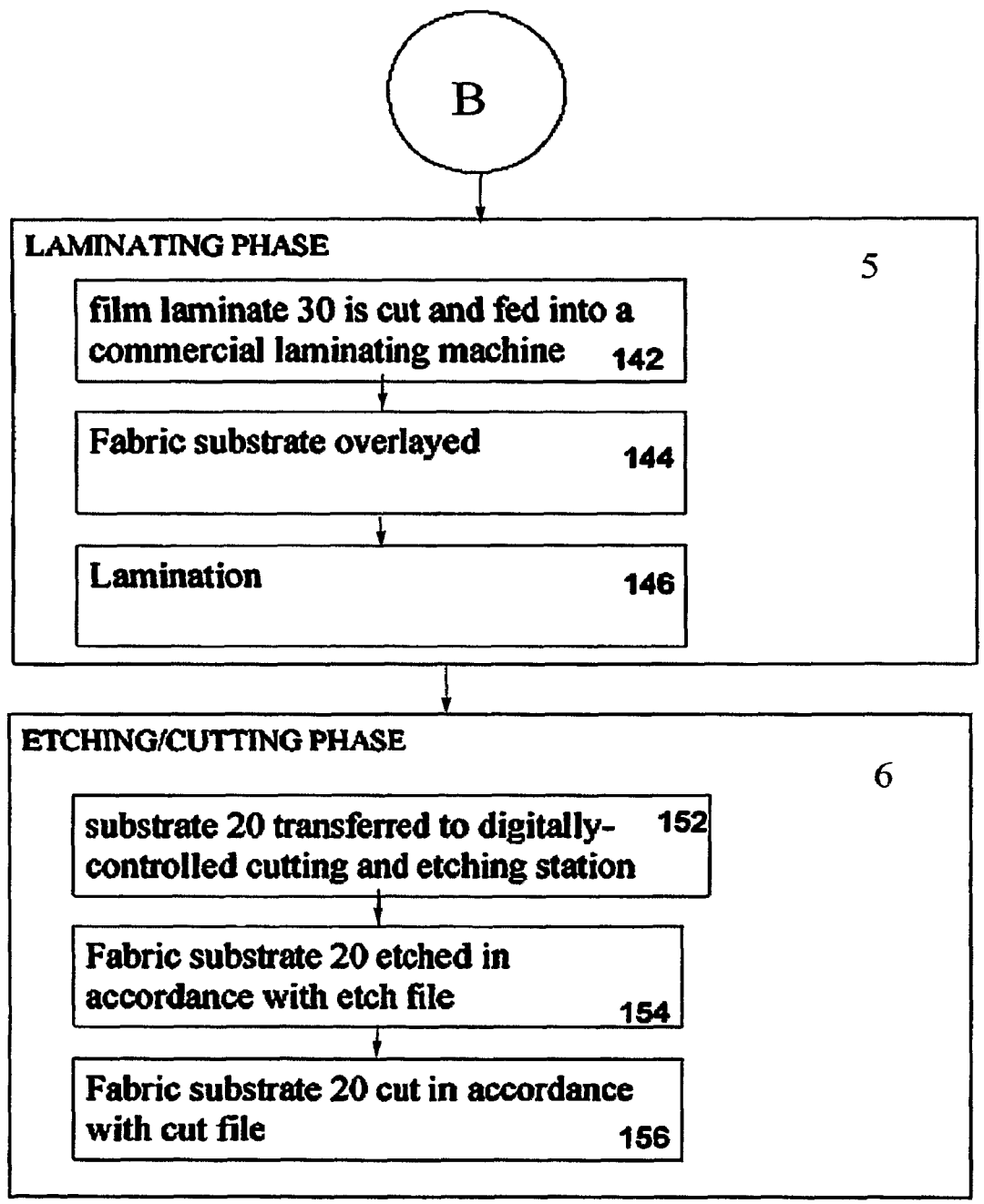

FIGS. 3(A-C) comprises a block diagram of the method steps and substeps involved in producing and applying the performance-embroidered emblem 10 as in FIGS. 1 & 2.

The production process for digitally printed appliqué emblems as described above begins with (1) a design phase by which a distinct image file is digitally created using raster imaging software for a newly generated design, or is derived from a pre-established design such as by scanning (in any case the image file may include both printed image elements and cutting elements); followed by (2) a separation phase in which, according to the preferred method, the cut file elements are converted from the raster file to a vector print file(s) to optimize cutting speed; (3) a printing phase by which the raster print image file is then input into a digital printer which translates the pixel color values to obtain the optimal color match for driving the digital printer based on the ink dye set used by that printer, the digital printer then precisely applying the ink droplets to a fabric substrate and thermosetting the ink, along with possible post treatment to improve fastness properties; (4) an optional embroidery phase that incorporates some stitching elements into the fabric substrate by traditional embroidery; (5) a coating/laminating phase by which the printed substrate is coated with a thermoplastic or pressure sensitive adhesive on its backside for later heat-sealing or pressure sealing to a garment, and (6) an etching/cutting phase for laser-etching (optional) of the front-side of the emblem to texturize and accentuate a textured appearance of embroidery stitching, plus die-cutting or laser-cutting of the emblem from the substrate. The above-described process results in an emblem bearing a combination of digitally-printed elements such as letters, logo graphics and numbers or other indicia, which may include a simulated embroidery-stitched appearance from either said printing or laser-etching or some combination of both, and all in a form that is easily heat-sealed to a garment or other textile. Each step of the process is described in detail.

Step 1. Design Phase

The first step is that of designing an emblem graphic design 22 using computer drawing software, and generating there from one or more files including printed image elements, optional engraving elements, and cutting elements. The image, engraving and cutting elements may be combined in a single file, or may be segregated into two or more files such as a separate print output file, etch output file (optional), and cut output file. With embroidery, designs can be derived from existing logo designs by scanning the logo design into a raster file format using RGB color image data composed of eight bits for each of the colors R, G, B and K (black), as seen at substep 100. Alternatively, as seen at substep 105, the emblems 10 may be designed from scratch using a computerized design process, which entails generating the text, numbers, graphics for the emblem 10 assisted by computer software. This is generally accomplished using graphics programs such as well-known Adobe Illustrator™ and Photoshop™. Such software is capable of calculating the emblem 10 dimensions from the design, and colors are chosen from a selectable palette.

For example, "Photoshop" software developed by Adobe uses a palette technique in which the image data is coded and compressed to a prescribed number of colors, e.g., 256 colors. The image file can be manipulated as desired to resize/rescale, redraw or alter the coloration. Typically, for an embroidered look, a stitching graphic comprising segmented threads-into-holes will be added around the periphery as seen as substep 110. Next, the final embroidered emblem RGB raster image file is established at substep 120. From this point, it is necessary to create a separate cut file (or "peripheral lines" file) for cutting the emblem and, if desired, a separate etch file for etching. The cut file is established at substep 130 by either selecting a line from the image file or by tracing the contour of the image. To make use of optical location capability of lasers or other cutting equipment, reference marks can be incorporated in the image print file for use by a laser or die cutter.

Laser cutting machines can follow both types of files but are significantly faster with vector-based images. The etch file is an optional substep 140 if texturizing the emblem is desired. This may include scoring backgrounds for shading or other textured effects, and in accordance with the invention, includes etching the stitching graphic where the threads enter the holes to give the holes a recessed three-dimensional look.

The respective image file, cut file and etch file may be stored separately, combined in a single file, or any combination of files.

Step 2. Separation Phase

In a raster representation, a bitmap specifies a set of pixel values at a set of raster positions to define an image. For purposes of the present invention it is necessary at step 2 to convert the raster-based cut elements which will be cut to vector-based elements for transfer to its respective processor. This can be accomplished with a software conversion engine that may be pre-existing raster-to-vector conversion software such as Adobe Illustrator™ utilities, AlgoLab R2V Toolkit™ or the like. As seen at substep 210, this is accomplished with each vector-based image file containing cut elements (or separate cut file) by the software conversion engine.

Next, at substep 220, for each raster image file, the present process relies on the conversion engine in the digital printer to take the raster print image file and translate the pixel color values to obtain the optimal color match for driving the digital printer based on the ink dye set used by the printer At this point the raster image file is transferred to the digital inkjet printer, and the etch and cut elements/files are transferred to a digital laser etching/cutting station (as will be described).

Step 3: Digital Print Phase

Next, at step 3, the fabric substrate 20 is then printed. This comprises a substep 330 of taking twill fabric 20 in bulk roll form, and feeding it at substep 332 in sheets or roll form into a thermal inkjet printer such as any of the Colorfast™ Fabrijet™ Thermal Inkjet, Stork Sapphire II™ digital printer or DuPont™ Artistri™ printer.

At substep 334 the ink portions 22, 23 are then printed on the twill substrate 20 in accordance with the raster image file to form a static latent image using a blend of the color primaries in the printers ink set including but not limited to four toner images of different colors, such as using respective yellow (Y), magenta (M), cyan (C) and black (K) toners, so that a multi-color image is formed. In addition to printing the raster image, at substep 336 the inkjet printer may print peripheral reference marks in accordance with the raster cut elements/file for use in subsequent operations to allow optimal referencing system to be used for etching and cutting of the emblem 10 as described below. At step 338 the image is then fused as the substrate 20 by using heat such as heated rolls, steam or by curing with ultraviolet light. To improve color fast properties the printed substrate can go through additional post treatment or washing steps.

Step 4 (Optional): Traditional Embroidery Phase

Prior to lamination (the next step) it is possible, if desired, to incorporate some stitching elements into the fabric substrate by traditional embroidery techniques.

Step 5: Laminating Phase

Next, at step 5, a thermally activated coating is applied to the non-printed side of the fabric substrate. This begins at substep 142 where a film laminate 30 is obtained in bulk roll form, is cut, and is fed into a commercial laminating machine. Other methods for applying the thermoplastic layer may include application in powder or liquid form. At substep 144 the fabric substrate 20 is overlayed for heat sealing thereto, and at substep 146 the lamination is effected.

Flatbed laminating is preferred, and a suitable laminating machine is the Glenro HTH or HTM model flatbed laminator from Glenro Inc., 39 McBride Ave., Paterson, N.J. 07501-1799. These are PLC-controlled machines and the heat is set in accordance with the glue line (melt) temperature of 307 degrees fahrenheit for the preferred laminate 30. This step melts the laminate 30 into the fabric substrate 20. Lamination of a pressure sensitive adhesive can alternatively be used with application occurring by the use of pressure rolls or platens. The laminating phase can occur prior to the printing phase but with present technology image quality and wash durability would be compromised.

Step 6: Etching and Cutting

At step 6 the printed and laminated substrate 20 is etched and cut.

This begins at substep 152 when the substrate 20 is transferred to a digitally-controlled cutting and etching station, including a laser cutter or digital die cutter. For purposes of illustration a digital laser cutter is herein employed, though digital die cutters may be used where etching is unnecessary. For example, the cutting and etching station may be an Atlanta FB-1500 Laser Cutting System manufactured by CADCAM Technologies, Inc. of Knottingham, England. The cutting and etching station includes an indexed cutting bed upon which the substrate 20 is placed and having an X-Y plotter with articulating laser head thereon or a rastering laser that directs the laser beam by driving mirrors to direct the beam on the bed. The heat from the laser beam cuts the fabric. The printed substrate 20 is placed on the bed and under cutter and laser head which moves along the bed to etch and/or cut the substrate 20.

At step 154 the substrate 20 is etched to highlight the emblem 10. For example, etching may be used to form the appearance of embroidered stitching thereon, or to surface texture the design. The etching maybe accomplished on the same cutting bed upon which the substrate 20 is placed, as above, using the same laser cutting system or can be done in a separate step on another machine. When used for texturizing, the etch file may include scoring backgrounds for shading or other textured effects. When used for simulating embroidery stitching through engraving or printing, the etch file can include a stitching graphic where the threads enter the holes to give the holes a recessed three-dimensional look. The laser etching controls the depth to which the substrate is removed to give a textured appearance.

At step 156 the substrate 20 is cut in accordance with the separate cut file to define letters, numbers, graphics, etc., and to form an outer periphery of the emblem 10. Cutting may be guided by machine-vision reference marks laid down during printing of the cut file (described above), and may be a reverse cut (from the back).

Upon completion of cutting and etching at steps 154 and 156, the laser head returns to a point of origin, allowing the user to retrieve the emblem 10. The waste portions are removed.

After cutting, the finished emblem 10 (inclusive of substrate 20 and laminate 30 may be sealed in a Mylar® or cellophane package for shipping, and is ready for application.

Once sent and unpackaged, the emblem 10 may be thermally applied. Electrically heated platen presses are the most commonly used means of applying the adhesive coated emblem 10 to garments or other articles. Temperature, pressure, and dwell time are the three basic seal conditions that must be controlled in order to ensure a proper bond. These three parameters should be established for each specific garment and embroidery combination. Generally, for the preferred embodiment illustrated above the temperature is held at approximately 307 deg F. (glueline temp at which point glue will melt), and this is sustained for 5-10 secs. Very thick materials will usually require a longer dwell time, to allow the greater mass to be heated, and to conduct the heat to the glue line. If pressure sensitive adhesives are utilized application can be accomplished by applying uniform pressure to the appliqué to adhere it to the garment.

The foregoing results in a color-printed and/highlighted emblem 10 as in FIG. 1 that gives an aesthetically-pleasing appearance.

It should now be apparent that the foregoing emblems 10 and method for production thereof result in a transfer appliqué bearing a combination of laser-printed elements such as letters, logo graphics and numbers or other indicia, laser-etching to accentuate the foregoing, and laser cutting of the elements, all in a form that is easily applied to a garment or other textile so that all of the elements are precisely registered without using direct embroidery. Since all of the printing, etching and cutting stations are controlled by common digital files, there is far less input required and all processing steps can be accomplished in-line, greatly increasing efficiency.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

INDUSTRIAL APPLICABILITY

Traditional embroidery, silk-screening, and sonic welding are all viable ways of attaching logos, emblems, decoration and identification to garments and textiles. However, each of these processes has certain deficiencies either in cost, complexity or quality of the end product. Nevertheless, the uniform and apparel industries seek less expensive emblems that nevertheless convey an authentic embroidered (stitched) look. Transfer emblems provide a partial solution as these may be applied to various cloth surfaces without embroidery. However, current transfer technology requires screen printing of ink designs and die-cutting of the emblem. These are independent steps creating a cumbersome process. In addition the resulting product is inferior in durability to washing and cannot be ironed. Further the preferred embodiment uses plastisols in the inks which are objectionable to many apparel manufacturers. Recent technological advances in the field of digital printing, and particularly the advent of thermal inkjet digital printers, provide an opportunity to reduce the cost, shorten development cycle time, shorten product cycle time and reduce the required inventories. However, these thermal inkjet digital printers have only been adapted for direct textile printing. They have not heretofore been used for intermediate printing onto a substrate that can be coated with adhesive backings, such as thermal activated or pressure sensitive adhesives for later application to a fabric substrate. Indeed, there is no current production method for producing multi-colored emblems that may be quickly and efficiently sealed on to garments to provide an embroidered and or appliquéd appearance. Clearly there is significant industrial advantage in the present process for producing a transfer appliqué bearing various combinations of digitally-printed elements such as letters, logo graphics and numbers or other indicia, that could include laser-etching to accentuate the foregoing, optional stitch elements, and then laser or die-cutting to provide a transfer emblem that can be easily applied to a garment or other textile so that all of the elements are precisely registered.

The invention claimed is:

1. An adhesive-appliqué for attachment to a garment and bearing printed indicia simulating embroidered stitching from among a group including text, numbers and logos, thereby giving said garment an embroidered emblem appearance, the appliqué comprising:
   a fabric substrate consisting of a single layer of twill fabric;
   a graphic design printed on a first side of said fabric substrate by a digital printer, said graphic design comprising a multi-color print element, and a simulated embroidery element around a periphery of said multi-color print element depicting embroidery-stitched thread entering a series of simulated holes;
   a laser-etch pattern etched into the first side of said fabric substrate by a digital laser, said laser etch pattern being in registration with and accenting the embroidery-stitched thread and said series of simulated holes of said simulated embroidery element, said laser etch pattern including a surface etched in relief where the embroidery-stitched thread of said simulated embroidery element enters said simulated holes to add a recessed three-dimensional texture to said simulated embroidery element and thereby simulating the texture of stitched embroidery;
   an adhesive laminate adhered to said fabric substrate for pressure or thermoplastic adhesion;
   said adhesive-appliqué being formed by the steps of,
   acquiring an emblem graphic image comprising a multi-color print element and a simulated embroidery element around a periphery of said multi-color print element depicting embroidery-stitched thread entering a series of simulated holes,
   generating a print output file from said emblem graphic image in raster format,
   generating a separate cut/etch output file from said emblem graphic in raster format,
   converting said raster-format cut/etch output file into a vector-format cut/etch output file;
   digitally-printing said emblem graphic design on one side of the fabric substrate in accordance with said raster-format print output file;
   digitally etching the one side of said fabric substrate in accordance with said converted vector-format cut/etch output file where the embroidery-stitched thread of said simulated embroidery element enters said simulated holes;
   whereby said appliqué is adapted to be adhered to said garment by said adhesive laminate and, when so secured, gives the appearance of an embroidered emblem simulating stitched designs.

2. The adhesive-appliqué according to claim 1, wherein said adhesive laminate is a thermoplastic film laminate from among a group including polyurethane, polyolefin, and polyester.

3. The adhesive-appliqué according to claim 1, wherein said adhesive laminate is a thermoplastic film within a range of approximately 2-7 thousandths of an inch.

4. The adhesive-appliqué according to claim 3, wherein said adhesive laminate is a thermoplastic film within a range of 20-35 gm/m2.

5. The adhesive-appliqué according to claim 4, wherein said adhesive laminate is a thermoplastic film having a glue line (melt) temperature within a range of from 225-350 degrees F.

6. The adhesive-appliqué according to claim 5, wherein said adhesive laminate has a softening point temperature below that of the glue line (melt) temperature.

7. The adhesive-appliqué according to claim 6, wherein said adhesive softening point is within a range of from 190-260 degrees Fahrenheit.

8. A method for providing digitally printed appliqué indicia, comprising the steps of:

designing an emblem graphic design using computer drawing software, said emblem graphic including a multi-color print element and a simulated embroidery element around a periphery of said multi-color print element depicting embroidery-stitched thread entering a series of simulated holes, and generating a separate print output file from said emblem graphic design in raster format for printing said multi-color print element and simulated embroidery element by a digital printing station, and a separate cut/etch output file from said emblem design in raster format;

converting said raster-format cut/etch output file to a vector-format cut/etch output file for cutting and etching said simulated embroidery element by a digital laser;

digitally-printing said emblem graphic design on one side of the fabric substrate at said digital printing station in accordance with said raster-format print output file;

digitally etching the one side of said fabric substrate in accordance with said converted vector-format cut/etch output file where the embroidery-stitched thread of said simulated embroidery element enters said simulated holes to add a recessed three-dimensional texture to said simulated embroidery element;

applying a thermally activated or pressure sensitive adhesive coating to another side of the fabric substrate; and cutting the bonded fabric substrate and carrier in accordance with said converted vector-format cut/etch output file.

9. The method for providing digitally printed appliqué indicia according to claim 8, wherein said step of digitally etching the one side of said fabric substrate in accordance with said converted vector-format cut/etch output file further comprises laser-etching said series of holes in relief to give said recessed three-dimensional texture to said simulated embroidery element.

10. A method for providing digitally printed appliqué indicia, comprising:

a design phase in which a distinct art file is digitally created in raster format using raster imaging software for newly generated art or is derived from a pre-established design, said distinct art file comprising a multi-color print element and a simulated embroidery element around a periphery of said multi-color print element depicting embroidery-stitched thread entering a series of simulated holes, and engraving and cutting elements are created in raster format and incorporated in the image file or in one or more other files;

a separation phase in which the engraving and/or cutting elements are converted from said raster format to a separate vector cut file(s) to optimize cutting speed; and a printing phase in which the raster format multi-color print element is input into a digital printer for translation of the pixel color values to obtain the optimal color match for driving the digital printer based on the ink dye set used by the printer, said simulated embroidery element is input to said digital printer, and in which said printer precisely applies ink droplets to a front side of a fabric substrate to depict said multi-color print element and simulated embroidery element;

a coating/laminating phase in which the printed substrate is coated with a thermoplastic or pressure sensitive adhesive on a backside of said fabric substrate for later application to a garment; and an etching/cutting phase by which said converted vector cut file(s) containing said etching and cutting elements are input to a digital laser for laser-etching of the frontside of the emblem to texturize and accentuate a textured appearance of embroidery stitching, and digitally etching the fabric substrate at said digital laser in accordance with said converted vector cut file(s) where the embroidery-stitched thread of said simulated embroidery element enters said simulated holes to add a recessed three-dimensional texture to said simulated embroidery element; and die-cutting or laser-cutting of the emblem from the substrate.

* * * * *